United States Patent [19]

Baker

[11] Patent Number: 5,493,201
[45] Date of Patent: Feb. 20, 1996

[54] STARTER/GENERATOR SYSTEM AND METHOD UTILIZING A LOW VOLTAGE SOURCE

[75] Inventor: Donal E. Baker, Rockford, Ill.

[73] Assignee: Sundstrand Corporation, Rockford

[21] Appl. No.: 339,627

[22] Filed: Nov. 15, 1994

[51] Int. Cl.$^6$ .................................................. F02N 11/00
[52] U.S. Cl. ........................................... 322/10; 322/44
[58] Field of Search .............................. 322/10, 13, 14, 322/16, 44

[56] References Cited

U.S. PATENT DOCUMENTS

| | | | |
|---|---|---|---|
| 3,652,920 | 3/1972 | South et al. | 322/19 |
| 4,743,777 | 5/1988 | Shilling et al. | 290/46 |
| 5,036,267 | 7/1991 | Markunas et al. | 332/10 |
| 5,055,764 | 10/1991 | Rozman et al. | 322/10 |
| 5,065,086 | 11/1991 | Takakado | 322/10 |
| 5,281,905 | 1/1994 | Dhyanchand et al. | 322/32 |
| 5,283,471 | 2/1994 | Raad | 290/46 |

Primary Examiner—Thomas M. Dougherty
Assistant Examiner—Nicholas Ponomarenko
Attorney, Agent, or Firm—Jeffery J. Makeever

[57] ABSTRACT

An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprises a synchronous starter/generator having a poly-phase wound stator, and a rotor rotatably positioned therein, the rotor also being drivably coupled to the turbine engine. Further, the system establishes an electric field in the rotor and directly couples the dc source to an inverter for alternately energizing each of the poly-phase stator windings to drive the starter/generator as a motor. This inverter establishes a rotating electric field in the stator whereby a constant torque is produced by the rotor to drive the turbine engine. Preferably, the inverter is a half wave inverter producing a pseudo-square wave current waveform. Alternatively, the inverter is a full wave inverter and the starter/generator neutral is disconnected during the start mode of operation. The method of driving the starter/generator as a motor comprises the steps of establishing field excitation, producing a poly-phase periodic half wave sinusoidal motor drive signal, scaling the motor drive signal by a scale factor, varying the scale factor during each period of the motor drive signal to produce a pseudo-square wave current waveform, and coupling the pseudo-square wave current waveform to the wound stator to drive the rotor to produce a constant torque.

31 Claims, 11 Drawing Sheets

STARTER/GENERATOR SYSTEM AND METHOD UTILIZING A LOW VOLTAGE SOURCE

FIELD OF THE INVENTION

The instant invention relates generally to turbine engine starter/generator systems, and more particularly to a starter/generator system for use with an aircraft auxiliary power unit (APU) providing starting capability from a low voltage power source, such as an aircraft battery, thus eliminating the need for a battery voltage boost inverter and isolation transformer.

BACKGROUND ART

Aircraft turbine engines typically employ starting systems which are separate from the electrical power generation system. Technology now exists which allows for the combination of these two functions into a single system comprising a generator which can be driven as a motor and an electronic power converter to perform the driving function. Auxiliary power units (APUs) are a subset of aircraft turbine engines which are also candidates for this combined starter/generator technology. In APU applications the turbine engine normally runs at a constant speed, driving the generator at a constant speed and, as such, does not require additional power conversion for the generate mode of operation. The start mode, however, requires a dedicated electronic converter to drive the generator as a motor to perform the start. The addition of this converter to the system is effectively offset in terms of cost, weight, and reliability by the elimination of the old dedicated starter motor and its associated gear train and mechanical disengagement device (clutch). Thus, there is a finite limit on the size and cost, as well as reliability, which the new converter must possess if it is to be a competitive candidate. A further requirement of this new APU starting system is that it must be capable of operating from the existing aircraft battery so that it will be compatible with existing systems and operational requirements.

Present APU starter generator system concepts are rather complex in order to satisfy all these requirements. For example, as illustrated in FIG. 1, a typical starter/generator system 100 requires three power converters (inverters), one for the motor torque generation/control function (main stator currents) 102, one for the exciter power generator control (main rotor current) 104, and an inverter 106 to boost the typical 28 Vdc battery voltage to a level compatible with the internal back EMF voltage produced by the starter/generator 108 during the starting process. Additionally, in APU applications, there is always a requirement to provide galvanic isolation between the input terminals of the starting system and its output terminals. This is because, in aircraft installations, the generator neutral and the battery negative terminal are permanently connected to ground (airframe) and isolation is necessary to prevent unwanted, non-torque producing, currents from flowing, thus providing maximum efficiency with minimal battery drain. Overall starter efficiency is of utmost importance in battery powered starting systems because of the limited amount of energy available from the battery.

It is not unusual for start systems with this type of architecture to be fiscally non-competitive with the existing DC motor starter systems, yet no one has come up with a suitable way to effectively improve upon this situation. The goal in the APU starter/generator concept is, therefore, to provide the best cost and efficiency by reducing the number of power converters and isolation transformers required. Achieving this goal will generally improve the size, weight, and efficiency of the system.

SUMMARY OF THE INVENTION

It is a principle objective of the instant invention, therefore, to provide a new and improved starter/generator system. More particularly, it is a principle objective of the instant invention to provide a new and improved starter/generator system capable of driving a prime mover, such as a turbine engine, from a low voltage source of dc voltage, such as an aircraft battery which will reduce overall system weight and cost, while increasing overall system efficiency.

In an embodiment of the instant invention, an electric power starter/generator system for a turbine engine capable of transforming mechanical power from the turbine engine to electric power during a generate mode of operation and of transforming electric power from a low voltage dc source to mechanical power to drive the turbine engine during a start mode of operation comprises a synchronous starter/generator having a poly-phase wound stator, and a rotor rotatably positioned therein, the rotor also being drivably coupled to the turbine engine. Further, the system establishes an electric field in the rotor and directly couples the dc source to an inverter for alternately energizing each of the poly-phase stator windings to drive the starter/generator as a motor. This inverter establishes a rotating electric field in the stator whereby a constant torque is produced by the rotor to drive the turbine engine.

In a preferred embodiment of the instant invention, the electric field is established in the rotor by a rotor excitation inverter having an input coupled to the dc source and an output electrically coupled to a rotor exciter field winding. The rotor excitation inverter produces an alternating current excitation waveform. Additionally, a voltage step-up transformer is interposed between the rotor excitation inverter output and the rotor exciter field winding to provide ac voltage sufficient in amplitude to drive the existing dc exciter winding which typically has high series inductance (reactance). Isolation between the dc source and the excitation circuit is optional to allow increased fault tolerance. This preferred embodiment further comprises rotor position sensing, through either a resolver or preferably via electronic position sensing, and a controller responsive to this rotor position for controlling the switches in the stator excitation (motor drive) inverter. This controller generates drive signals to produce the stator excitation waveform to maintain the resulting torque at a desired level. In this preferred embodiment, this inverter is a full wave inverter and the stator excitation waveform is a poly-phase sinusoidal waveform. For this full wave embodiment, the poly-phase stator windings are wound in a star configuration having a neutral connection coupled to ground. During the start mode of operation, however, the neutral connection is disconnected from ground by a ground isolation relay or other appropriate means.

In a highly preferred embodiment of the instant invention, the stator excitation inverter comprises a half wave inverter having a switch and a rectifier, such as a diode or preferably a controlled rectifier, per phase, coupled through a node in series opposition across the dc source. When a controlled rectifier is used, the controller generates rectifier control signals to disable each controlled rectifier, per phase, when a back emf waveform produced by the starter/generator becomes negative. In this way, counter torque producing currents are inhibited and the negative portion of the back emf waveform is undisturbed, and the controller can use this waveform to sense the position of the rotor. For this highly preferred embodiment, the controller provides a stator excitation waveform produced by the half wave inverter which departs from a normal half wave by a scale factor, varying from 1.5 to 3.0 during each cycle of the waveform, to maintain a constant ripple free torque. In this way, the stator excitation waveform is transformed from a half wave sinusoidal waveform to a pseudo-square current wave.

In a preferred embodiment of the instant invention, the method of driving the starter/generator as a motor comprises the steps of establishing field excitation, producing a poly-phase periodic half wave sinusoidal motor drive signal, scaling the motor drive signal by a scale factor, varying the scale factor during each period of the motor drive signal to produce a pseudo-square wave current waveform, and coupling the pseudo-square wave current waveform to the wound stator to drive the rotor to produce a constant torque. Further, this method monitors a back emf waveform produced by the motor, and calculates the rotor position from the back emf waveform during its negative cycle.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 2:
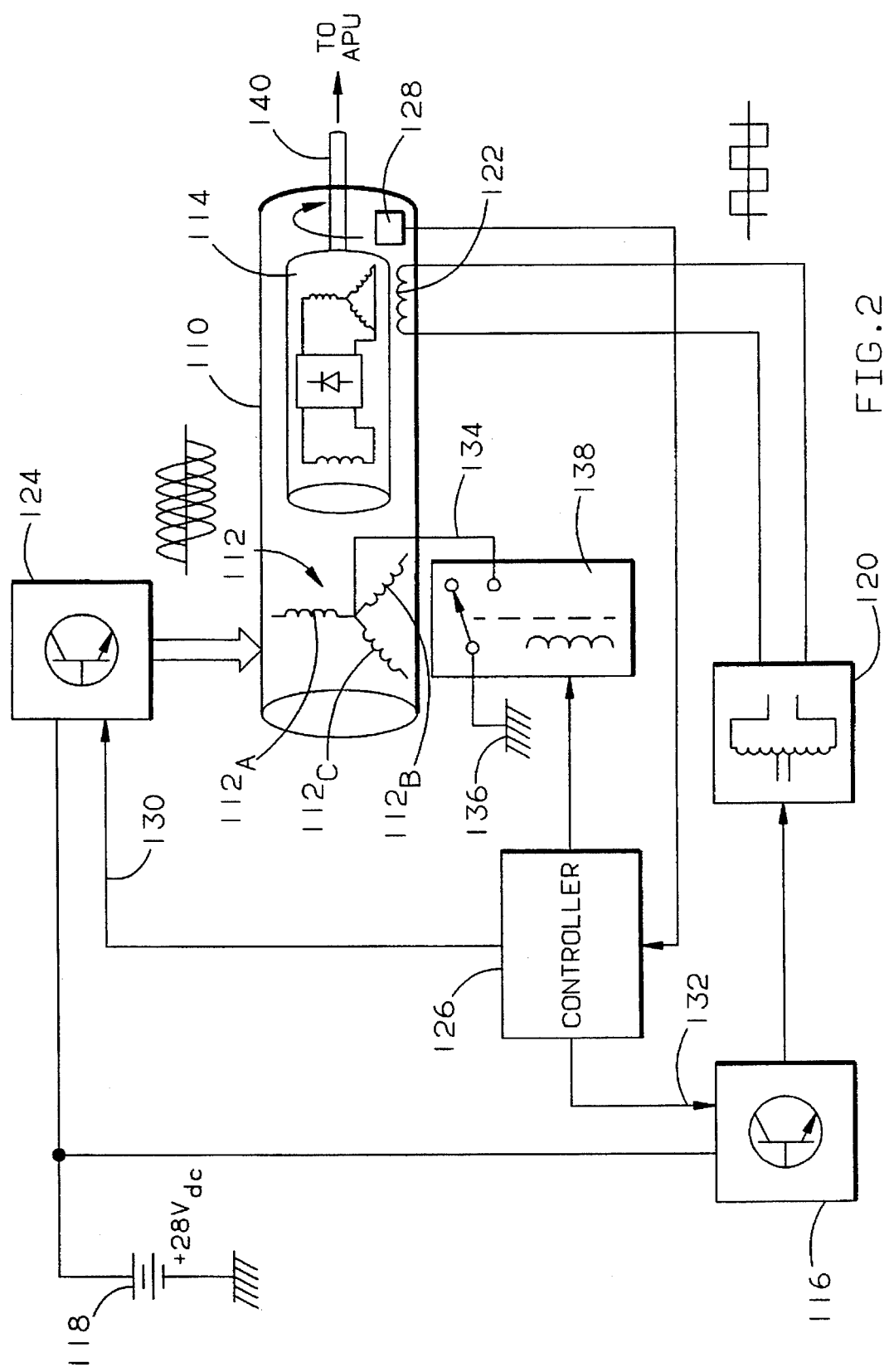
FIG. 2 is a block diagram of an embodiment of the starter/generator system of the instant invention.

In a preferred embodiment of the instant invention, as illustrated in FIG. 2, a starter/generator 110 having a poly-phase wound stator 112 and a rotor 114 rotatably positioned therein. The rotor 114 is drivably coupled to a turbine engine or other load (not shown). The preferred embodiment further comprises means for establishing an electric field in the rotor, as illustrated by a rotor excitation inverter 116. The rotor excitation inverter 116 has an input coupled directly to a low voltage source of dc power, such as the 28 Vdc aircraft battery 118. This inverter 116 produces a sinusoidal excitation waveform which is coupled through the excitation voltage step-up transformer 120 to the exciter field 122 of the starter/generator 110. Other means known in the art may be used to establish the electric field in the rotor, such as through the use of permanent magnets, etc. A means for alternately energizing each of the poly-phase stator windings $112_A$, $112_B$, $112_C$ is directly coupled to the battery 118 to establish a rotating electric field in the stator 112. This rotating electric field drives the rotor 114 with a constant torque to drive the turbine engine or other load (not shown). This energizing means comprises an inverter 124 having its input directly coupled to the battery 118, and its poly-phase output directly coupled to the poly-phase stator windings $112_A$, $112_B$, $112_C$.

A means for controlling the switches of the inverter 124 and the rotor excitation inverter 116, as illustrated by controller 126, senses the position of the rotor 114 by means such as resolver 128 or other appropriate means. This controller generates drive signals on lines 130 and 132 to control the inverters 116 and 124. Inverter 124 is a full wave inverter producing a poly-phase sinusoidal stator excitation waveform. The neutral connection 134 of the wye or star configured stator 112 is coupled through a means for disconnecting the neutral connection 134 from ground 136 during the start mode of operation. As illustrated in FIG. 2, this means is a neutral isolation relay 138 which is controlled by a signal from the controller 126.

This system is particularly well suited to APU power system applications which exhibit an inherently high ratio of starter/generator rating to mechanical cranking power needed to start the APU. Preferably, the ratios will be in the range of 15–20 to one. However, since aircraft battery requirements allow the battery voltage to be quite low, it is necessary to establish how low the dc voltage may droop, yet still be able to provide useful cranking torque. Of primary concern is the internal back emf generated by the starter/generator 110 because it is this back emf which determines the requirements for the minimum DC link voltage. It is assumed that the starter/generator's exciter 122 will be driven by AC in the manner described above to produce main field excitation during the start cycle.

Proceeding with the full wave operation of the starter/generator 110, it is assumed that the motor currents are provided by the inverter 124 relative to rotor position such that the maximum peak torque is produced at any given speed, i.e. the currents are in phase with the back emf of the starter/generator 110. There are several rules governing this type of synchronous starter system. The first is a machine law which states that the back emf of the starter/generator 110 is proportional to the product of speed and excitation level as follows:

$$V_{emf}=N*I_x \qquad (1)$$

where $V_{emf}$ is the internal back emf of the starter/generator 110, N is the speed in rpm under consideration, and $I_x$ is the main field excitation current. For simplicity of analysis, all of these variables will be expressed in per unit (PU) terms relative to the generate mode machine ratings. Since the back emf must be overcome by the inverter 124, Vemf can also represent the minimum inverter DC voltage required in PU value. Hence:

$$V_{link}=N*I_x \qquad (2)$$

The second machine law relates to the relationships between torque, speed, and power at the starter/generator's mechanical output (shaft 140). This law states that a constant power curve intersects a constant torque line at a point which is defined as:

$$P_{max} = N_{crit} * T_{max} \quad (3)$$

where these variables are also expressed in PU terms, and $N_{crit}$ is the speed at which the torque and horsepower curves intersect.

A third relationship is important here and it is a machine law which states that the torque is proportional to the product of the stator current and the excitation current. Keeping in mind that the controller 126 controls the angle between the stator current and the rotor position for best torque, this relationship is stated as:

$$T = I_{stator} * I_x \quad (4)$$

This relationship can be applied to equation (3) which yields:

$$P_{max} = N_{crit} * I_{statormax} * I_x \quad (5)$$

again in PU values relative to the starter/generator rating. Combining equation (3) or (5) with equation (1), to eliminate the speed term N, an important set of equations is obtained for the starter mode of operation as follows:

$$V_{link} = \frac{P_{max} * I_x}{T_{max}} \quad (6)$$

or $$V_{link} = \frac{P_{max}}{I_{statormax}} \quad (7)$$

For an exemplary system having a starter/generator rating of 60 kVA, a maximum shaft power of approximately 3.0 kW equates to 0.050 PU. Assuming a value of 1.0 for inverter 124 output ($I_{statormax}$) we see from equation (7) that:

$$V_{link} = \frac{0.05}{1.0} = 0.05 \, PU \text{ volts.} \quad (8)$$

Thus the minimum battery voltage for a 115 Vac line-to-neutral system, i.e. 270 Vdc rectified, is:

$$270 * 0.05 = 13.5 \, Vdc. \quad (9)$$

This is within reach of the 28 Vdc battery 118, even operating at a minimum voltage of 20 Vdc, with margin to spare for AC feeder voltage drop.

Figure 3:
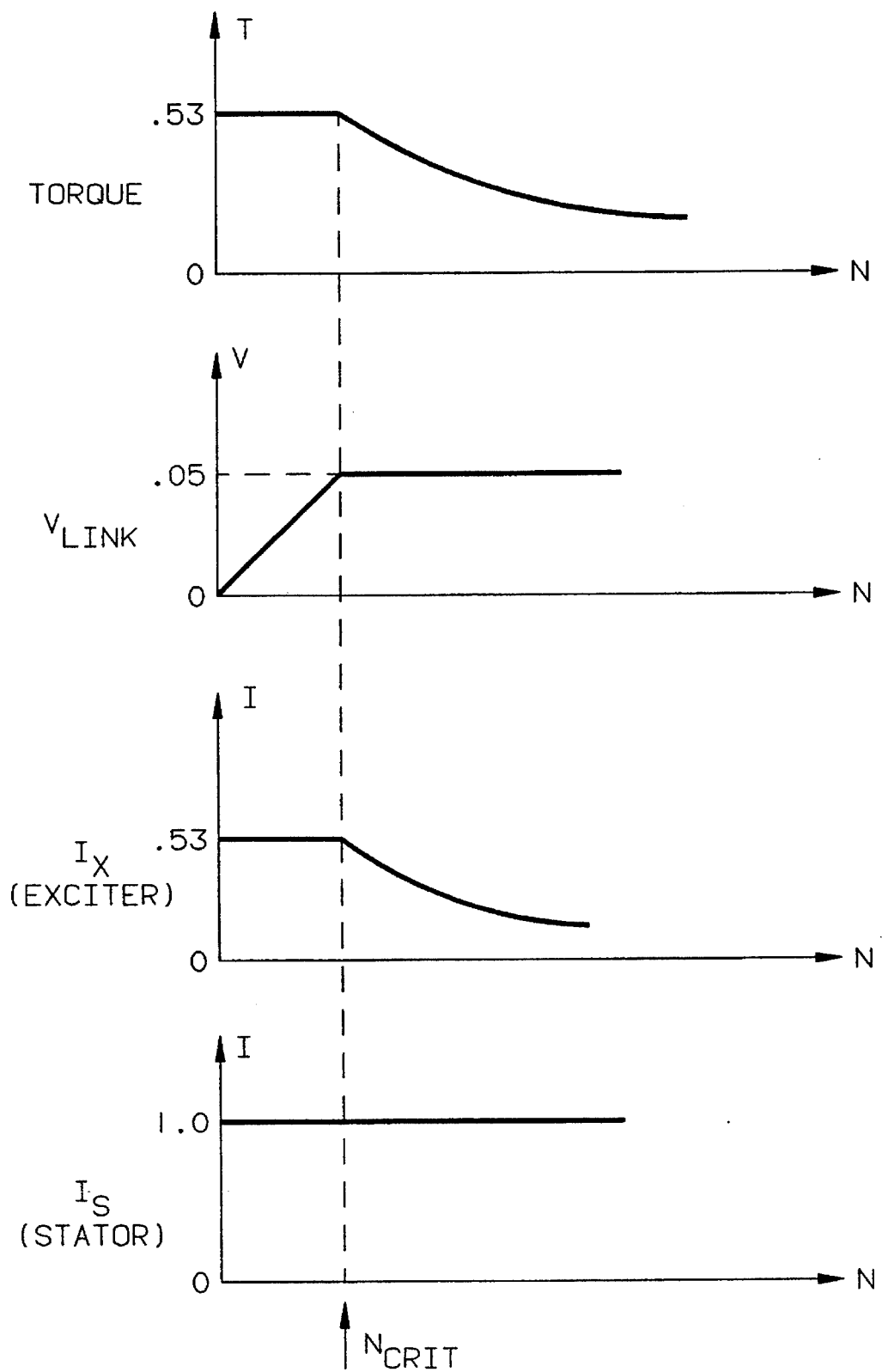
FIG. 3 is a graphical illustration of the starting parameters of the embodiment of FIG. 2.

For a typical system the peak cranking torque required to accelerate the engine is approximately 5 ft-lb at the engine, or 37.5 ft-lb at the starter/generator shaft 140. Since rated torque for a 6000 rpm, 60 kVA starter/generator is 70 ft-lb, the cranking torque is 37.5/70 or 0.53 PU torque (see FIG. 3). From equation (4) we see that the exciter must be driven at:

$$I_x = \frac{0.53}{1.0} = 0.53 \, PU \text{ amps.} \quad (10)$$

Figure 4:
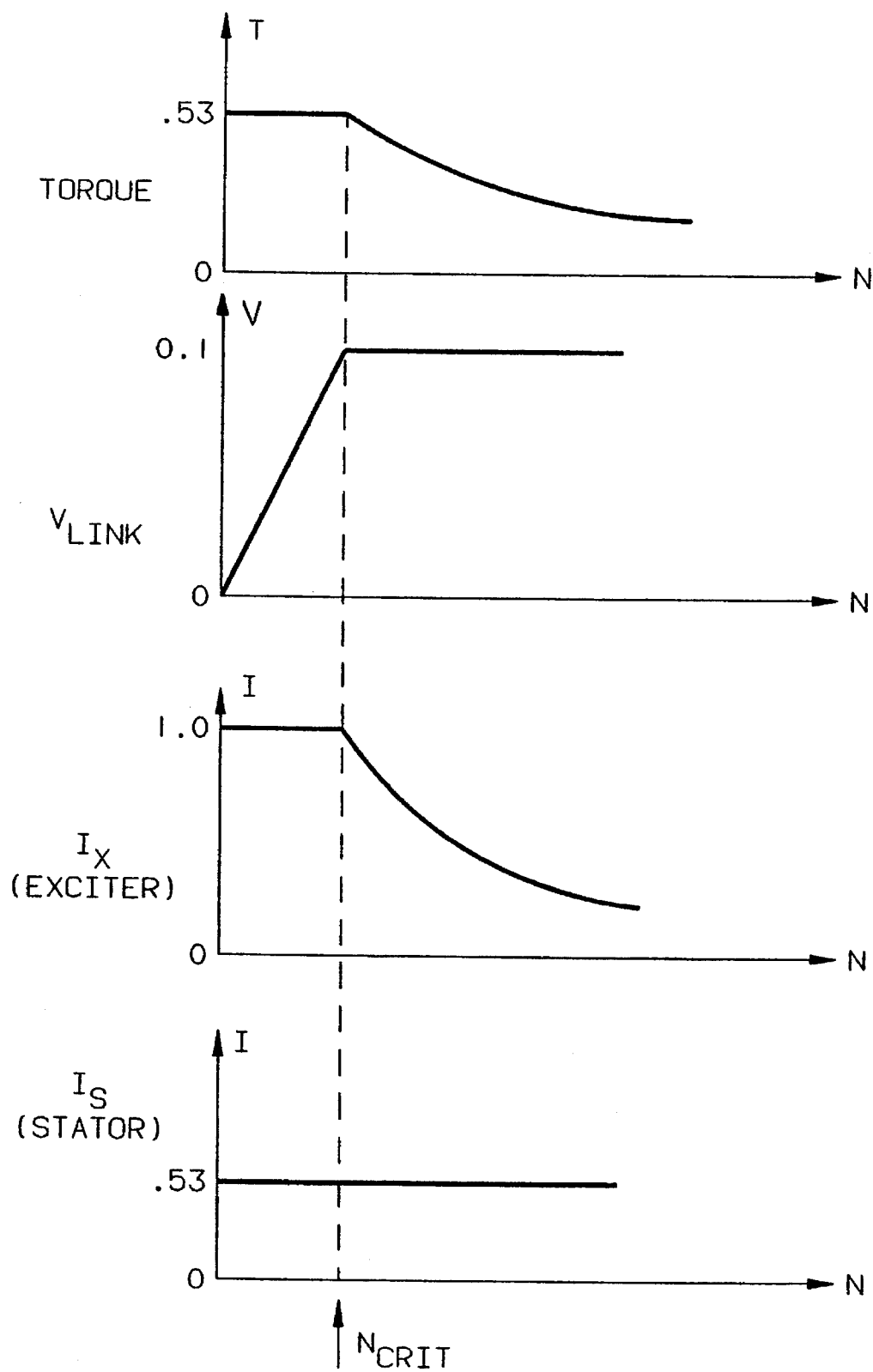
FIG. 4 is a further graphical illustration of the starting parameters of the embodiment of FIG. 2.

As will be recognized by one skilled in the art, there is a certain degree of freedom in this particular example which can be used to optimize performance of the system. For example, the battery voltage $V_{link}$ could be changed to a higher level by lowering $I_{stator}$ (see equation (7)) and still get the desired torque by simply raising excitation accordingly (see equation (4)). For example, 0.53 PU torque can also be achieved for $I_{stator}$ of 0.53 PU and $I_x$ of 1.0 PU. We will still be able to reach the same critical speed ($N_{crit}$) if the extra link voltage is made available (see FIG. 4).

Figure 5:
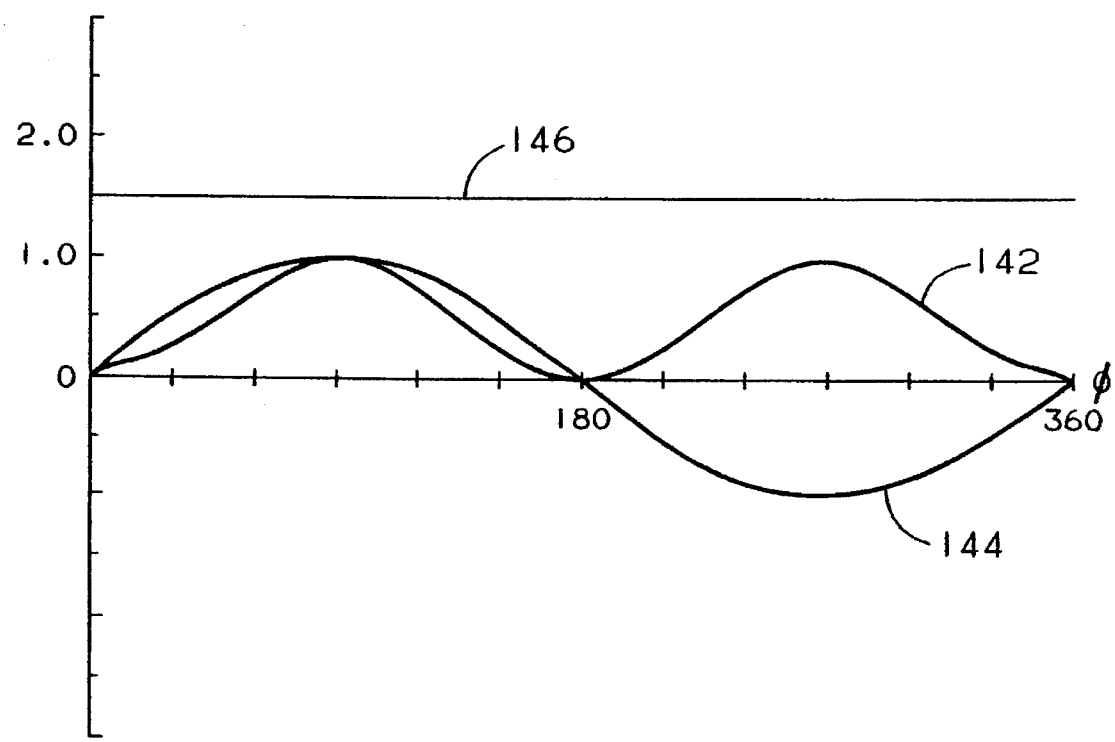
FIG. 5 is a graphical illustration of the full wave current and torque produced by the embodiment of FIG. 2.

As illustrated by the above discussion of an embodiment of the instant invention, the starting of the APU can be accomplished directly from the aircraft battery 118 without the need for a boosting converter as required by the prior art. As the system of the instant invention accelerated the APU past the critical speed, de-excitation of the main rotor will be necessary to keep the back emf of the starter/generator compatible with the link voltage of 20 to 28 Vdc. Thus operation of the system requires control of both the stator current and the rotor excitation to maintain optimum efficiency. As shown in FIG. 5, the torque 142 produced by each phase current 144 of the poly-phase excitation waveform sums with the other torque components which are equal in magnitude but displaced by 120° for the three phase exemplary system. The total torque generated, therefore, is the sum of the three individual phase torque components, and is illustrated in FIG. 5 as line 146 at a value of 1.5 units of torque.

Figure 6:
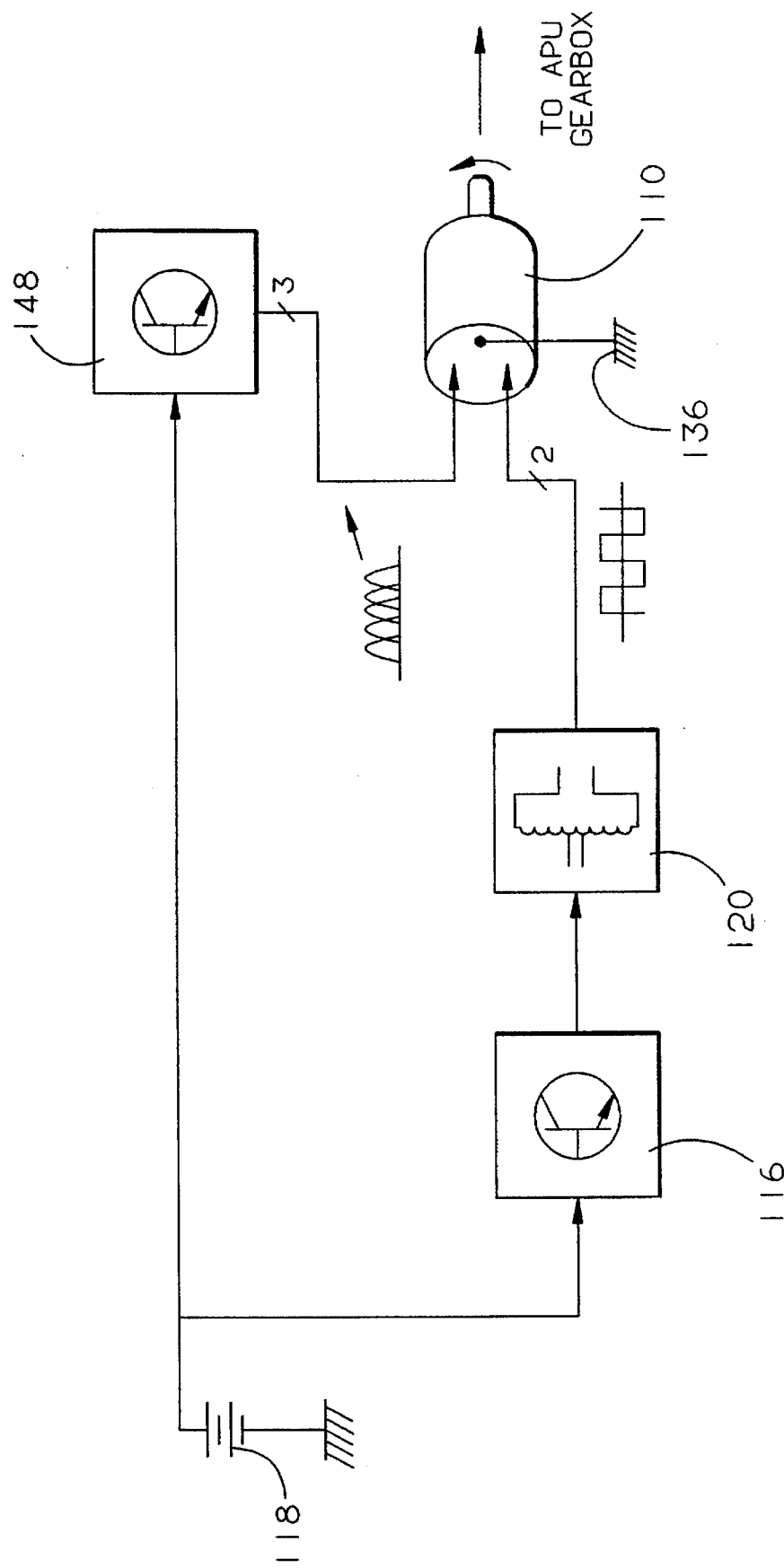
FIG. 6 is a block diagram of a further embodiment of the starter/generator system of the instant invention.

In a highly preferred embodiment as illustrated in FIG. 6, the stator excitation inverter 124 and the neutral isolation relay 138 are replaced with a half wave inverter 148. Operating the starter/generator 110 in a half wave fashion uses the machine 110 in a lower voltage, higher current mode than for the full wave embodiment as described hereinabove and illustrated in FIG. 2. An advantage of this highly preferred embodiment is that the effective back emf (internal voltage) generated by the starter/generator 110 will appear less to the driving inverter 148 because the applicable back emf will be the half wave line-to-neutral voltage, rather than the full wave line-to-line voltage seen by the full wave inverter 124 of FIG. 2. Thus, the inverter 148 of the highly preferred embodiment can operate from a battery 118 with less voltage than that needed for the full wave embodiment. The DC voltage for critical speed of the full wave embodiment described above will be reduced well below 13.5 Vdc and will insure compatibility with a 20 Vdc minimum battery voltage.

Figure 7:
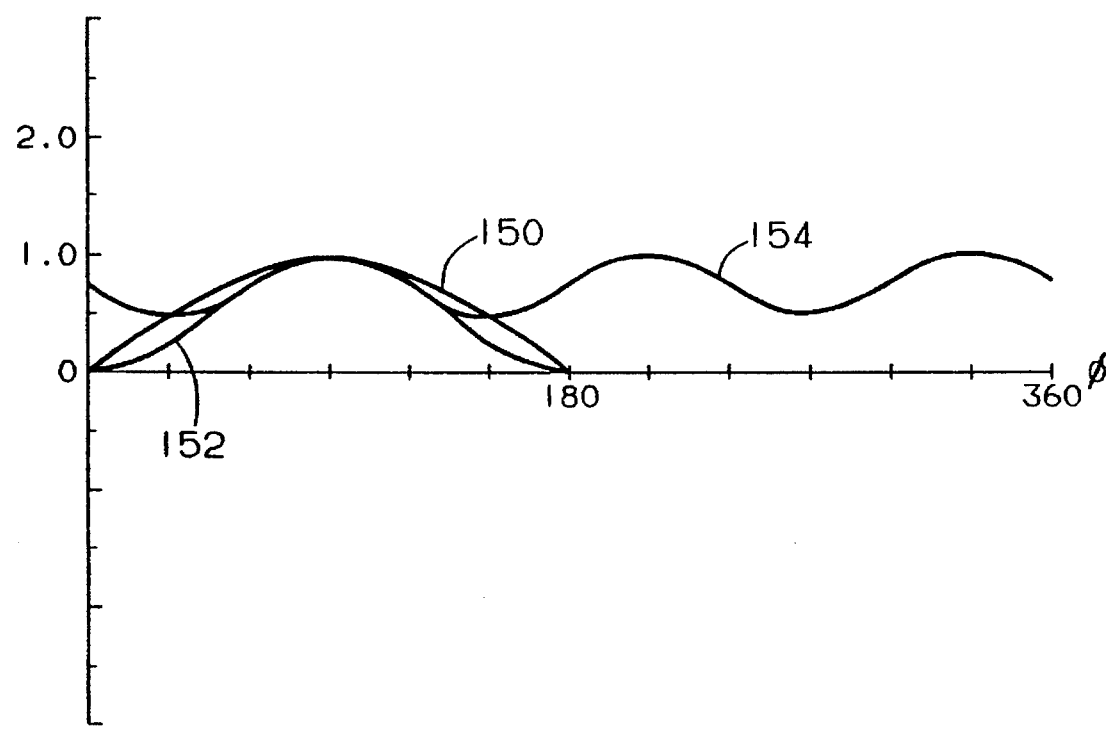
FIG. 7 is a graphical illustration of the half wave current and torque produced by a true half wave inverter.

An analysis of a three phase starter/generator operating in a half wave, current mode from an inverter 148 with the optimum torque angle shows a reduced torque per amp of line current. This is due to the fact that at any instant of time the half wave driven starter/generator has fewer turns of the main stator windings $112_A$, $112_B$, $112_C$ energized. As will be appreciated by one skilled in the art, at any instant of time a full wave motor will have an effective torque to amp-turn coupling factor of 1.5 when the optimum torque angle is provided between stator current and rotor position as described hereinabove. The half wave starter/generator, on the other hand, will have a factor which varies between 0.5 and 1.0 as illustrated by FIG. 7. This figure shows a single phase half wave current waveform 150, its corresponding torque component 152, and a summed torque waveform 154 which is the resultant of all three phases.

Figure 8:
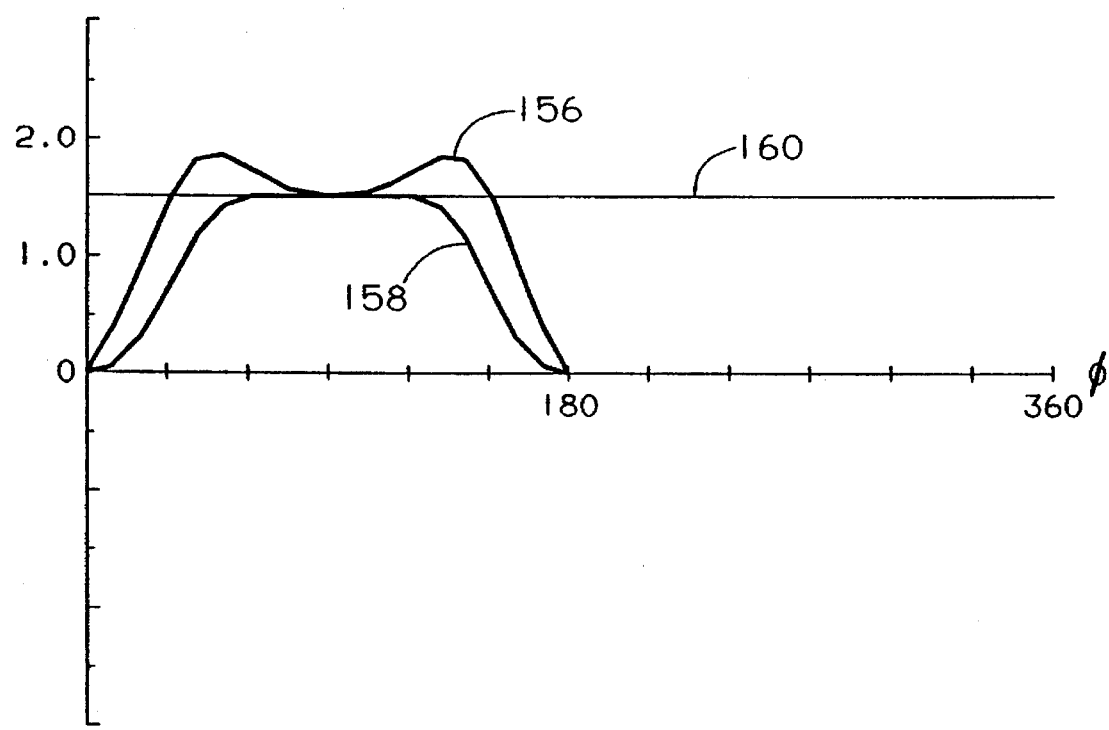
FIG. 8 is a graphical illustration of the modified half wave current and torque produced by the embodiment of FIG. 6.

In order to recover the torque to the desired 1.5 effective value, the half wave inverter 148 of the highly preferred embodiment will require that the current be increased above that of a sine wave at some points in the waveform by a factor of 1.5 (1.5/1.0), and at other points by a factor of three (1.5/0.5). The resultant current needed in the half wave embodiment of the instant invention to produce the equivalent torque of the full wave embodiment will be a pseudo-square wave current 156 with an RMS magnitude about 1.46 times that of the peak sine wave current in the full wave machine (see FIG. 8). The torque 158 produced by this current waveform 156 sums with the other phase components to form a constant ripple free torque 160.

Figure 9:
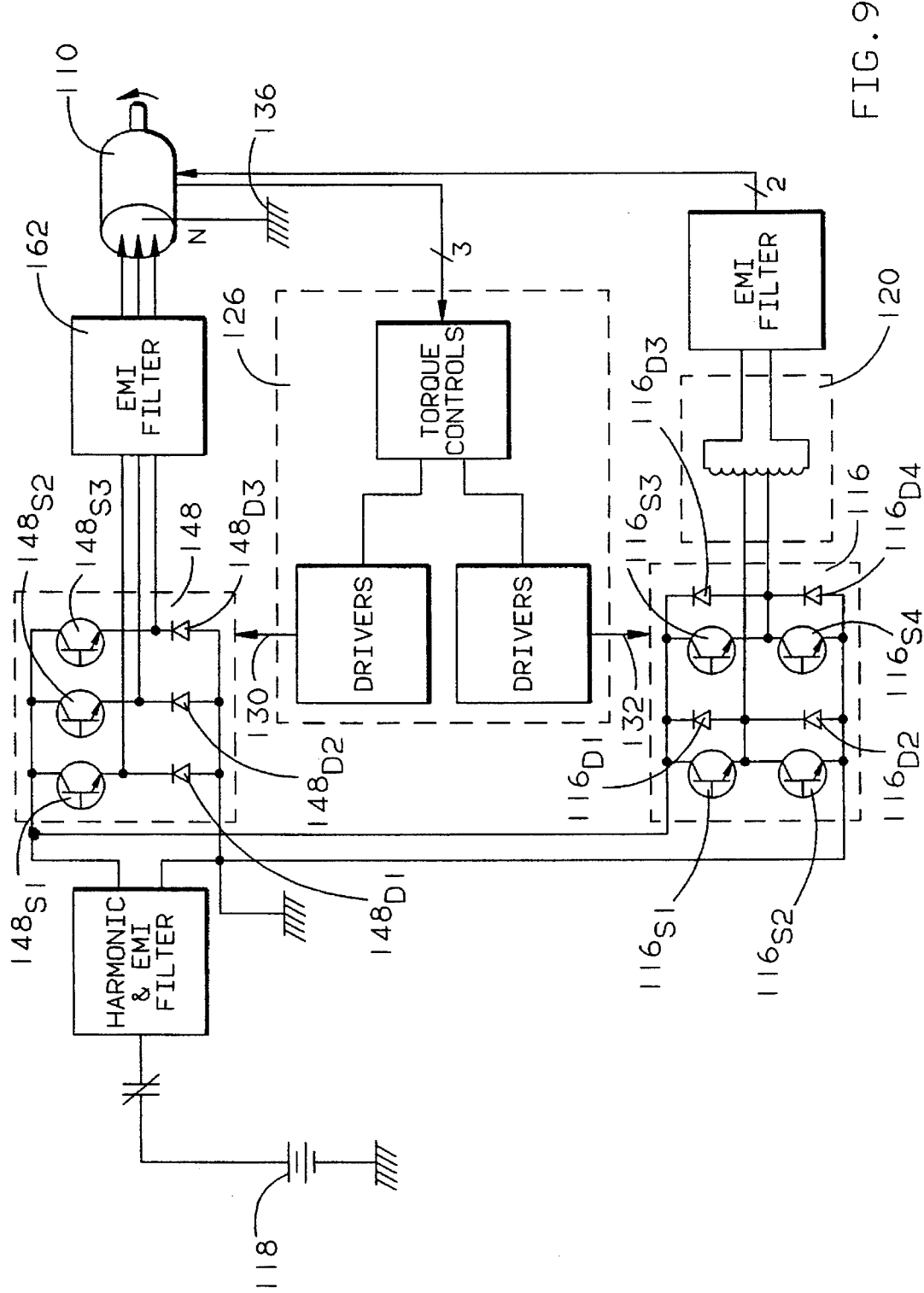
FIG. 9 is a schematic diagram of an embodiment of the starter/generator system of FIG. 6.

A more detailed schematic of this embodiment is illustrated in FIG. 9. As can be seen from this illustration, the rotor excitation inverter 116 preferably comprises a single phase full wave inverter having switches $116_{S1}$, $116_{S2}$, $116_{S3}$, and $116_{S4}$, with their corresponding cross coupled diodes $116_{D1}$, $116_{D2}$, $116_{D3}$, and $116_{D4}$, directly coupled across the battery 118. The stator excitation half wave inverter 148 comprises a switch $148_{S1}$ and a diode $148_{D1}$, per phase, coupled through a node in series opposition across the battery 118. Each of these nodes forms the output of the inverter 148, and may be filtered by filter 162 prior to being coupled to the starter/generator's stator winding based on system requirements. As will be recognized by one skilled in the art, the switches in inverter 148 may be of any appropriate technology, such as insulated gate bi-polar transistors (IGBT), MOS-controlled thyristors (MCT), static induction transistors (SITs), et cetera.

Figure 1:
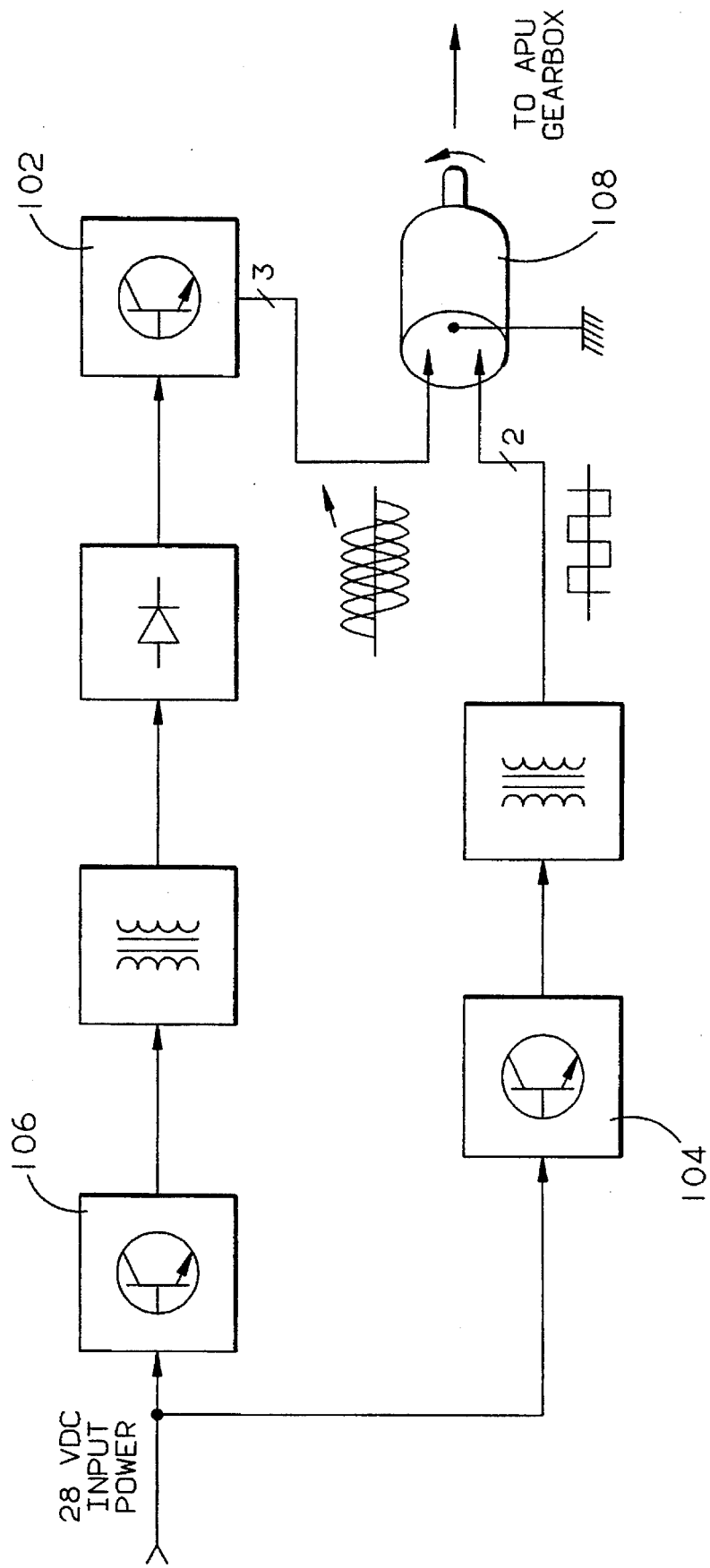
FIG. 1 is a block diagram of a prior art starter/generator system.
Figure 10:
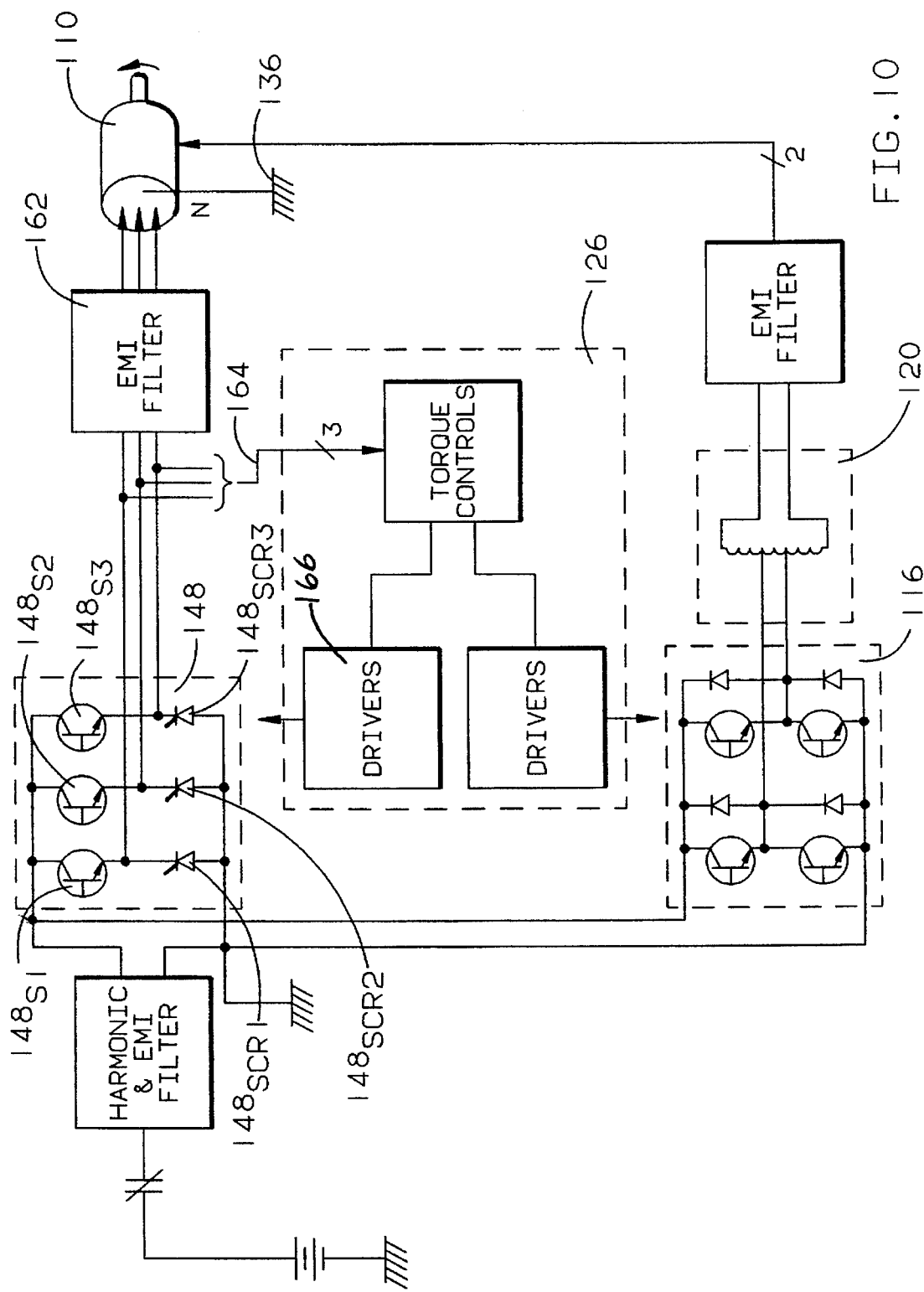
FIG. 10 is a schematic diagram of a further embodiment of the starter/generator system of FIG. 6.

A highly preferred embodiment of the half wave inverter 148 is shown in FIG. 10. In this embodiment the diodes $148_{D1}$, $148_{D2}$, and $148_{D3}$ are replaced by controlled rectifiers $148_{SCR1}$, $148_{SCR2}$, and $148_{SCR3}$ to provide a means to prevent reverse current flow to insure that the motor currents are half wave. Also, the resolver 128 (see FIG. 1) is no longer required as the rotor position sensing is accomplished by monitoring the negative emf generated by the starter/generator 110 via lines 164. The drivers 166 control conduction of the switches $148_{S1}$, $148_{S2}$, and $148_{S3}$, and the controlled rectifiers $148_{SCR1}$, $148_{SCR2}$, and $148_{SCR3}$ in such a manner that during the time the back EMF of a starter/generator phase voltage is negative, both the switch and controlled rectifier will be turned off. Thus, the associated "pole" of the half wave inverter 148 will be completely cutoff so that negative currents cannot flow, assuring that no counter torques or feeder copper losses are produced. Thus, maximum operating efficiency for the system is assured.

A further advantage of this embodiment, as mentioned above, is that during the negative half cycles, the associated phase voltages are relatively undisturbed electrically, and thus, may provide useful information regarding the rotor position. An electronic position sensor will provide the desired position decoding and this will, in turn, eliminate the need for a dedicated position sensor 128 (see FIG. 1) and the associated wiring between the controller 126 and the starter/generator 110.

Figure 11:
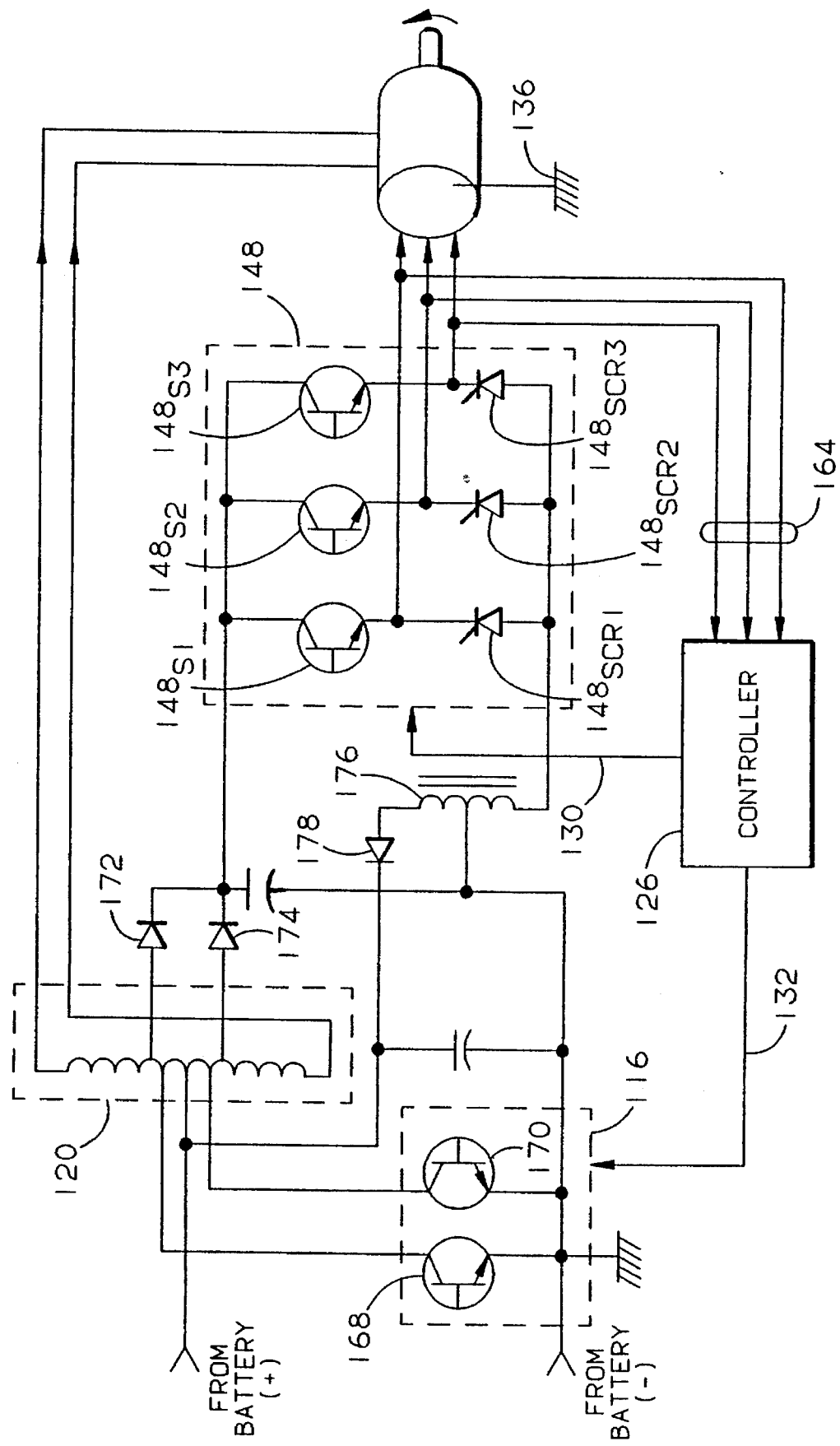
FIG. 11 is a schematic diagram of a preferred embodiment of the starter/generator system of the instant invention.

An even more highly preferred embodiment of the instant invention is illustrated in FIG. 11. As will be appreciated by one skilled in the art, the rotor excitation inverter 116 and the stator half wave inverter 148 are both coupled through the voltage step-up transformer 120 which now is also coupled directly to the battery. In this embodiment, the rotor excitation inverter 116 comprises a first controllable switch, such as transistor 168, and a second controllable switch, such as transistor 170 coupled to the step-up transformer 120 and to the return as shown. These switches 168, 170 are alternatively actuated to control the excitation level by varying the frequency of the AC excitation waveform generated thereby. An advantage of this embodiment is that with the addition of a first and a second rectifying diode 172, 174, the voltage level input to the inverter 148 can be increased to compensate for older type generators having high resistance stators, thus enabling the use of the instant invention in many more applications. The input voltage may be varied by coupling to the step-up transformer 120 at a different location, thus varying the turns coupling. Additionally, a commutation transformer 176 and a steering diode 178 are utilized in this embodiment, interposed between the controlled rectifiers $148_{SCR1}$, $148_{SCR2}$, $148_{SCR3}$, and the battery, to generate a negative voltage reference for the inverter 148. Commutation to a negative voltage, as opposed to ground, increases the negative di/dt and results in a faster decay of the stator current, which therefore results in a torque wave which more closely represents the desired pseudo-square wave (see FIG. 8, trace 158).

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprising:

a synchronous starter/generator having a poly-phase wound stator, and a rotor rotatably positioned therein, said rotor being drivably coupled to the turbine engine;

means for establishing an electric field in said rotor;

means directly coupled to the dc source for alternately energizing each of said poly-phase stator windings to drive said starter/generator as a motor, said energizing means establishing a rotating electric field in said stator whereby a constant torque is produced by said rotor to drive the turbine engine; and wherein said energizing means comprises
   an inverter having an input directly coupled to the dc source, and a poly-phase output directly coupled to said poly-phase stator windings during the entire start mode of operation, said inverter having controllable switches responsive to drive signals for producing a stator excitation waveform,
   means for sensing rotor position, and
   means responsive to said rotor position for controlling said switches, said control means generating said drive signals to produce said stator excitation waveform to maintain said torque at a desired level.

2. The starter/generator system of claim 1, wherein said means for establishing an electric field in said rotor comprises a rotor excitation inverter having an input coupled to the dc source and an output electrically coupled to a rotor exciter field winding, said rotor excitation inverter producing a sinusoidal excitation waveform on said output.

3. The starter/generator system of claim 2, wherein said means for establishing an electric field in said rotor further comprises a voltage step-up transformer interposed between said rotor excitation inverter output and said rotor exciter field winding.

4. The starter/generator system of claim 3, wherein said rotor excitation inverter comprises a first and a second controllable switch coupled through said voltage step-up transformer, said controllable switches alternatively actuating to control excitation level by varying frequency of said sinusoidal excitation waveform.

5. An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprising:

a synchronous starter/generator having a poly-phase wound stator, and a rotor rotatably positioned therein, said rotor being drivably coupled to the turbine engine;

means for establishing an electric field in said rotor;

means directly coupled to the dc source for alternately energizing each of said poly-phase stator windings to drive said starter/generator as a motor, said energizing means establishing a rotating electric field in said stator whereby a constant torque is produced by said rotor to drive the turbine engine; and wherein said energizing means comprises an inverter having an input directly coupled to the dc source, and a poly-phase output directly coupled to said poly-phase stator windings, said inverter having controllable switches responsive to drive signals for producing a stator excitation waveform, means for sensing rotor position, and means responsive to said rotor position for controlling said switches, said control means generating said drive signals to produce said stator excitation waveform to maintain said torque at a desired level; and wherein said inverter is a full wave inverter and wherein said stator excitation waveform is a poly-phase sinusoidal waveform.

6. The starter/generator system of claim 5, wherein said poly-phase stator windings are wound in a star configuration having a neutral connection coupled to ground, and further comprising means for disconnecting said neutral connection from ground during the start mode of operation.

7. The starter/generator system of claim 6, wherein said disconnecting means comprises an isolation relay responsive to a relay control signal, and wherein said control means further generates said relay control signal during said start mode of operation to open said isolation relay disconnecting said neutral connection from ground thereby.

8. An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprising:

a synchronous starter/generator having a poly-phase wound stator, and a rotor rotatably positioned therein, said rotor being drivably coupled to the turbine engine;

means for establishing an electric field in said rotor; and means directly coupled to the dc source for alternately energizing each of said poly-phase stator windings to drive said starter/generator as a motor, said energizing means establishing a rotating electric field in said stator whereby a constant torque is produced by said rotor to drive the turbine engine;

wherein said energizing means comprises an inverter having an input directly coupled to the dc source, and a poly-phase output directly coupled to said poly-phase stator windings, said inverter having controllable switches responsive to drive signals for producing a stator excitation waveform, means for sensing rotor position, and means responsive to said rotor position for controlling said switches, said control means generating said drive signals to produce said stator excitation waveform to maintain said torque at a desired level; and wherein said inverter is a half wave inverter.

9. The starter/generator system of claim 8, wherein said half wave inverter comprises a switch and a diode, per phase, coupled through a node in series opposition across the dc source, and wherein said node, per phase, forms said inverter output.

10. The starter/generator system of claim 9, wherein said rotor position sensing means is a resolver.

11. The starter/generator system of claim 9, further comprising a commutation transformer in series with a steering diode interposed between said diode and the dc source, said commutation transformer and steering diode generating a negative voltage reference for said half wave inverter thereby improving negative di/dt and insuring fast current decay times.

12. The starter/generator system of claim 8, wherein said half wave inverter comprises a switch and a controlled rectifier, per phase, coupled through a node in series opposition across the dc source, wherein said controlled rectifier is responsive to a rectifier control signal, wherein said node, per phase, forms said inverter output, and wherein said control means generates said rectifier control signal to disable said controlled rectifier, per phase, when a back emf waveform produced by said starter/generator becomes negative.

13. The starter/generator system of claim 12, wherein said rotor position sensing means determines said rotor position by monitoring said negative back emf waveform.

14. The starter/generator system of claim 12, further comprising a commutation transformer in series with a steering diode interposed between said controlled rectifier and the dc source, said commutation transformer and steering diode generating a negative voltage reference for said half wave inverter thereby improving negative di/dt and insuring fast current decay times.

15. The starter/generator system of claim 8, wherein said stator excitation waveform is a poly-phase pseudo-square wave having an effective torque to amp-turn coupling factor of approximately 1.5.

16. The starter/generator system of claim 8, wherein said stator excitation waveform produced by said half wave inverter departs from a normal half sine wave by a variable scale factor to maintain a constant torque.

17. The starter/generator system of claim 16, wherein said variable scale factor varies over the range from 1.5 to 3.0 during each cycle of said stator excitation waveform.

18. A method of driving a motor having a poly-phase wound stator, an exciter field, and a rotor rotatably positioned within the stator, the rotor being coupled by a shaft to a load, comprising the steps of:

establishing field excitation;

producing a poly-phase periodic half wave sinusoidal motor drive signal;

scaling said motor drive signal by a scale factor;

varying said scale factor during each period of said motor drive signal to produce a pseudo-square wave current waveform; and coupling said pseudo-square wave current waveform to the wound stator to drive the rotor to produce a constant torque.

19. The method of claim 18, further comprising the steps of:

sensing a position of the rotor; and shifting a phase displacement of said pseudo-square wave current waveform to achieve an optimum torque angle.

20. The method of claim 19, wherein the step of sensing a position of the rotor comprises the steps of:

monitoring a back emf waveform produced by the motor; and calculating rotor position from the back emf waveform during a negative cycle thereof.

21. An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprising:

a synchronous starter/generator having a poly-phase wound stator, and a rotor rotatably positioned therein, said rotor being drivably coupled to the turbine engine;

a voltage step-up transformer coupled to the dc source;

means coupled to said step-up transformer for establishing an electric field in said rotor; and means coupled to said step-up transformer for alternately energizing each of said poly-phase stator windings to drive said starter/generator as a motor, said energizing means establishing a rotating electric field in said stator whereby a constant torque is produced by said rotor to drive the turbine engine.

22. The starter/generator system of claim 21, wherein said means for establishing an electric field in said rotor comprises a rotor excitation inverter producing an AC excitation waveform, said rotor excitation inverter having a first and a second controllable switch coupled through said voltage step-up transformer, said first and said second controllable switch alternatively actuating to control excitation level by varying frequency of said AC excitation waveform.

23. The starter/generator system of claim 21, wherein said energizing means comprises a half wave inverter having an input coupled by a first and a second rectifying diode to said voltage step-up transformer, and a poly-phase output directly coupled to said poly-phase stator windings, said inverter having controllable switches responsive to drive signals for producing a stator excitation waveform, means for sensing rotor position, and means responsive to said rotor position for controlling said switches, said control means generating said drive signals to produce said stator excitation waveform to maintain said torque at a desired level.

24. The starter/generator system of claim 23, wherein said half wave inverter comprises a switch and a diode, per phase, coupled through a node in series opposition, and wherein said node, per phase, forms said inverter output.

25. The starter/generator system of claim 24, further comprising a commutation transformer in series with a steering diode interposed between said diode and the dc source, said commutation transformer and steering diode generating a negative voltage reference for said half wave inverter thereby increasing negative di/dt.

26. The starter/generator system of claim 23, wherein said half wave inverter comprises a switch and a controlled rectifier, per phase, coupled through a node in series opposition, wherein said controlled rectifier is responsive to a rectifier control signal, wherein said node, per phase, forms said inverter output, and wherein said control means generates said rectifier control signal to disable said controlled rectifier, per phase, when a back emf waveform produced by said starter/generator becomes negative.

27. The starter/generator system of claim 26, wherein said rotor position sensing means determines said rotor position by monitoring said negative back emf waveform.

28. The starter/generator system of claim 26, further comprising a commutation transformer in series with a steering diode interposed between said controlled rectifier and the dc source, said commutation transformer and steering diode generating a negative voltage reference for said half wave inverter thereby increasing negative di/dt.

29. The starter/generator system of claim 23, wherein said stator excitation waveform is a poly-phase pseudo-square wave having an effective torque to amp-turn coupling factor of approximately 1.5.

30. An electric power starter/generator system for a turbine engine capable of transforming mechanical power from the turbine engine to electric power during a generate mode of operation and of transforming electric power from a low voltage dc source to mechanical power to drive the turbine engine during a start mode of operation, comprising;

a synchronous starter/generator having a poly-phase wound stator, and a rotor rotatably positioned therein, said rotor being drivably coupled to the turbine engine;

a voltage step-up transformer coupled to the dc source;

means coupled to said step-up transformer for establishing an electric field in said rotor;

means coupled to said step-up transformer for alternately energizing each of said poly-phase stator windings to drive said starter/generator as a motor, said energizing means establishing a rotating electric field in said stator whereby a constant torque is produced by said rotor to drive the turbine engine;

wherein said energizing means comprises a half wave inverter having an input coupled by a first and a second rectifying diode to said voltage step-up transformer, and a poly-phase output directly coupled to said poly-phase stator windings, said inverter having controllable switches responsive to drive signals for producing a stator excitation waveform, means for sensing rotor position, and means responsive to said rotor position for controlling said switches, said control means generating said drive signals to produce said stator excitation waveform to maintain said torque at a desired level; and wherein said stator excitation waveform produced by said half wave inverter departs from a normal half sine wave by a variable scale factor to maintain a constant torque.

31. The starter/generator system of claim 30, wherein said variable scale factor varies over the range from 1.5 to 3.0 during each cycle of said stator excitation waveform.

* * * * *